United States Patent [19]
Martin

[11] Patent Number: 5,947,505
[45] Date of Patent: Sep. 7, 1999

[54] LAWN MOWER RIDING SULKY

[76] Inventor: John W. Martin, 4415 Wendy Hills Dr., Crestwood, Ky. 40014

[21] Appl. No.: 08/916,492

[22] Filed: Aug. 22, 1997

Related U.S. Application Data

[60] Provisional application No. 60/041,258, Mar. 17, 1997.

[51] Int. Cl.⁶ .................................................. B62D 63/00
[52] U.S. Cl. .......................................... 280/493; 280/32.7
[58] Field of Search .................................. 280/32.7, 493, 280/494; 172/677, 631, 450, 453

[56] References Cited

U.S. PATENT DOCUMENTS

| | | |
|---|---|---|
| 224,390 | 2/1880 | Cole . |
| 1,385,535 | 7/1921 | Frisby . |
| 2,354,576 | 7/1944 | Clark . |
| 2,563,372 | 8/1951 | Risse . |
| 2,729,196 | 1/1956 | Breitenbach . |
| 2,919,756 | 1/1960 | Knipe ..................................... 280/32.7 |
| 2,955,835 | 10/1960 | Chovinard . |
| 4,588,199 | 5/1986 | Fischer .................................... 280/204 |
| 4,828,282 | 5/1989 | Pinto . |
| 5,004,251 | 4/1991 | Velke et al. . |
| 5,076,600 | 12/1991 | Fake ....................................... 280/202 |
| 5,118,123 | 6/1992 | Betrock . |
| 5,257,885 | 11/1993 | Reil . |
| 5,388,850 | 2/1995 | Simone . |
| 5,413,364 | 5/1995 | Hafendorfer . |
| 5,785,453 | 7/1998 | Marty et al. ............................... 280/94 |
| 5,810,371 | 9/1998 | Velke ..................................... 280/32.7 |
| 5,813,679 | 9/1998 | Hobrath .................................. 280/32.7 |

OTHER PUBLICATIONS

Velke Sulke, Wright Manufacturing,Inc., Gaithersburg, MD.
Turf Rider,Inc., Minnetonka, MN, Specifications & Design.
Byers Gold, Louisville, KY—Rider Attachment.
Jungle Wheels, Jungle Jim's Accessories, Louisville, KY.

*Primary Examiner*—Lanna Mai
*Assistant Examiner*—Andrew J. Fischer
*Attorney, Agent, or Firm*—Wheat, Smith & Beres, PLC; Vance A. Smith; David W. Nagle, Jr.

[57] ABSTRACT

A riding attachment is adapted to be connected to a self-propelled lawn mower for carrying a standing rider/operator behind the mower during operation of the mower. This riding attachment includes a mounting assembly, a tow bar assembly, and a riding assembly. One end of the tow bar assembly is pivotably connected to the mounting assembly to allow for rotation of the tow bar assembly about a first axis parallel to a plane of the mower and transverse to the direction of movement of the mower. The riding assembly is pivotally connected to the second end of the tow bar to allow the riding assembly to pivot about a second axis parallel to the plane of said mower and in the direction of movement of said mower. The riding attachment further includes a pivot limiting element that limits the pivoting of the riding assembly out of the plane of the mower to a predetermined limit angle. This riding attachment thus safely carries the operator behind the mower over uneven terrain, preventing dislodgement of the operator or overturning of the riding assembly on which the operator stands.

7 Claims, 3 Drawing Sheets

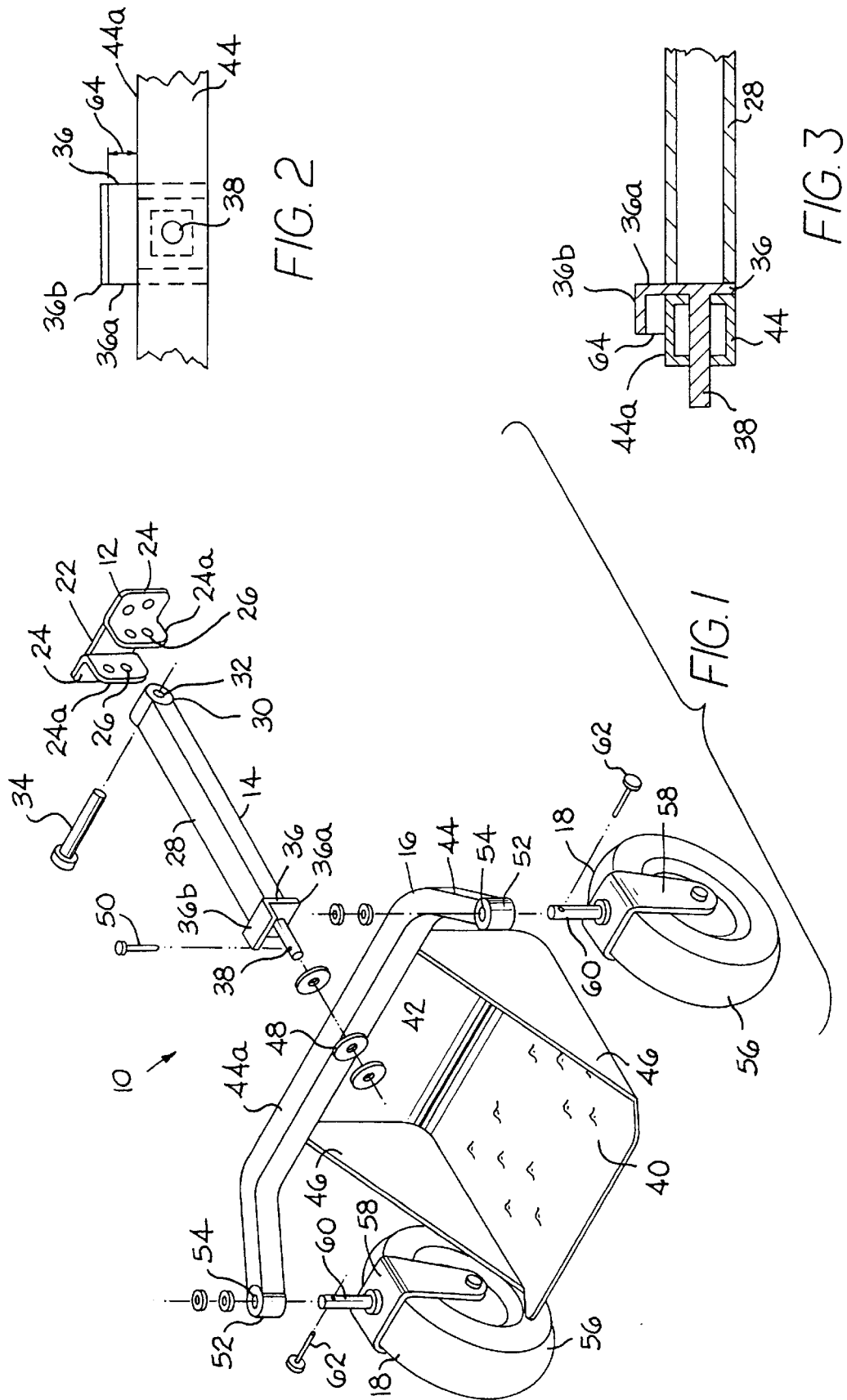

LAWN MOWER RIDING SULKY

This application is a provision of Ser. No. 60/041,258 filed Mar. 17, 1997.

BACKGROUND OF THE INVENTION

The invention described herein pertains to a sulky for a self-propelled lawn mower for carrying an operator in a standing position safely behind the mower, thus eliminating the need for the operator to walk behind the mower, and more particularly, a sulky for carrying a standing operator such that the operator may remain on the sulky platform even while operating the mower through a sharp turn or operating the mower in reverse.

Devices for attachment to self-propelled power lawn mowers, allowing a standing operator to be carried with the mower, have been in use for many years. An early example may be seen in U.S. Pat. No. 2,955,835 issued Oct. 11, 1960 to Choumnard. The apparatus, typically called a "sulky", consists of a platform mounted between two wheels that is connected to the mower by a tow bar. Choumnard's tow bar is connected to the mower by a universal joint allowing the sulky to move in all directions relative to the mower during operation. Another sulky apparatus is illustrated in U.S. Pat. No. 5,004,1991 to Velke; it employs a platform covering a single wheel located between foot plates for the operator's feet. The platform is pivotally connected to one end of the tow bar along a vertical axis, allowing free rotation of the platform horizontally. The other end of the tow bar is pivotally connected to the mower along a horizontal axis to allow the platform and tow bar to move up and down with respect to the mower. Still another sulky apparatus is described in U.S. Pat. No. 5,413,364 issued May. 9, 1995 to Hafendorfer; this sulky provides another pivoting action as it permits the sulky to pivot about an axis that is aligned with the length of the tow bar. Pivoting of the sulky about this axis permits the sulky to accommodate uneven ground.

None of the sulky apparatus typified by the above references addresses the problem of severe horizontal rotation of the sulky with respect to the mowers where the steering mechanism, generally in the form of handlebars extending back from the mower, can impact the operator standing on the sulky platform. Additionally, the sulkies that have the ability to pivot out of the plane of the mower, as described in the aforementioned patent to Hafendorfer, do not adequately resolve the matter of too much pivoting of the sulky away from the plane of the mower, pivoting that could result in the dislodgement of the operator or overturn of the entire sulky.

It is a paramount object of the present invention to provide for a sulky apparatus that minimizes the problem of jack-knifing and/or impact of the handlebars and operator.

It is still another important object of the present invention to provide for a sulky apparatus that permits the sulky to pivot relative to the mower plane but minimizes the risk of the sulky overturning.

Other important objects will become clear to those skilled in the art upon a reading of the description accompanied by the appended drawings.

SUMMARY OF THE INVENTION

The present invention pertains to a riding attachment adapted to be connected to a self-propelled lawn mower for carrying a standing rider/operator and comprising a tow bar assembly, a riding assembly, and a pivot limiting element that limits the pivoting of the riding assembly out of the plane of the mower to a predetermined limit angle. The tow bar assembly is pivotally connected to the mower for pivoting about a first axis essentially parallel to the mower plane and essentially transverse to the direction of movement of the mower during operation. The tow bar assembly is constrained against pivoting with respect to the mower about an axis essentially vertical. The riding assembly, including a platform for supporting the standing operator, is pivotally connected to the tow bar assembly for pivoting about a second axis essentially parallel to the mower plane and to the direction of movement of the mower. The riding assembly is also constrained against pivoting about an axis essentially vertical with respect to the tow bar assembly. The pivot limiting element is associated with the tow bar assembly and limits the pivoting of the riding assembly about the second axis so that the riding assembly is prevented from turning over when severely uneven terrain is encountered.

BRIEF DESCRIPTION OF THE DRAWINGS

FIG. 1 is an exploded perspective view of the riding attachment of the present invention, showing each of the individual components of a preferred embodiment;

FIG. 2 is an end view of the pivot flange and a portion of the support bar of the platform assembly;

FIG. 3 is a sectional view taken along lines 3—3 of FIG. 1;

DETAILED DESCRIPTION OF THE PREFERRED EMBODIMENT

The attachment is generally comprised of a mounting bracket assembly, tow bar assembly, and a rolling operator platform assembly. Prior art attachments have been made to carry an operator, but the device described herein is constructed so that the platform rotates with the operator; thus, the operator may remain on the platform while backing up or turning the mower. This attachment also permits limited rotation about the horizontal axis created by the tow bar; however, the rotation is limited physically to prevent the platform from turning over or throwing the operator from the platform.

Figure 4:
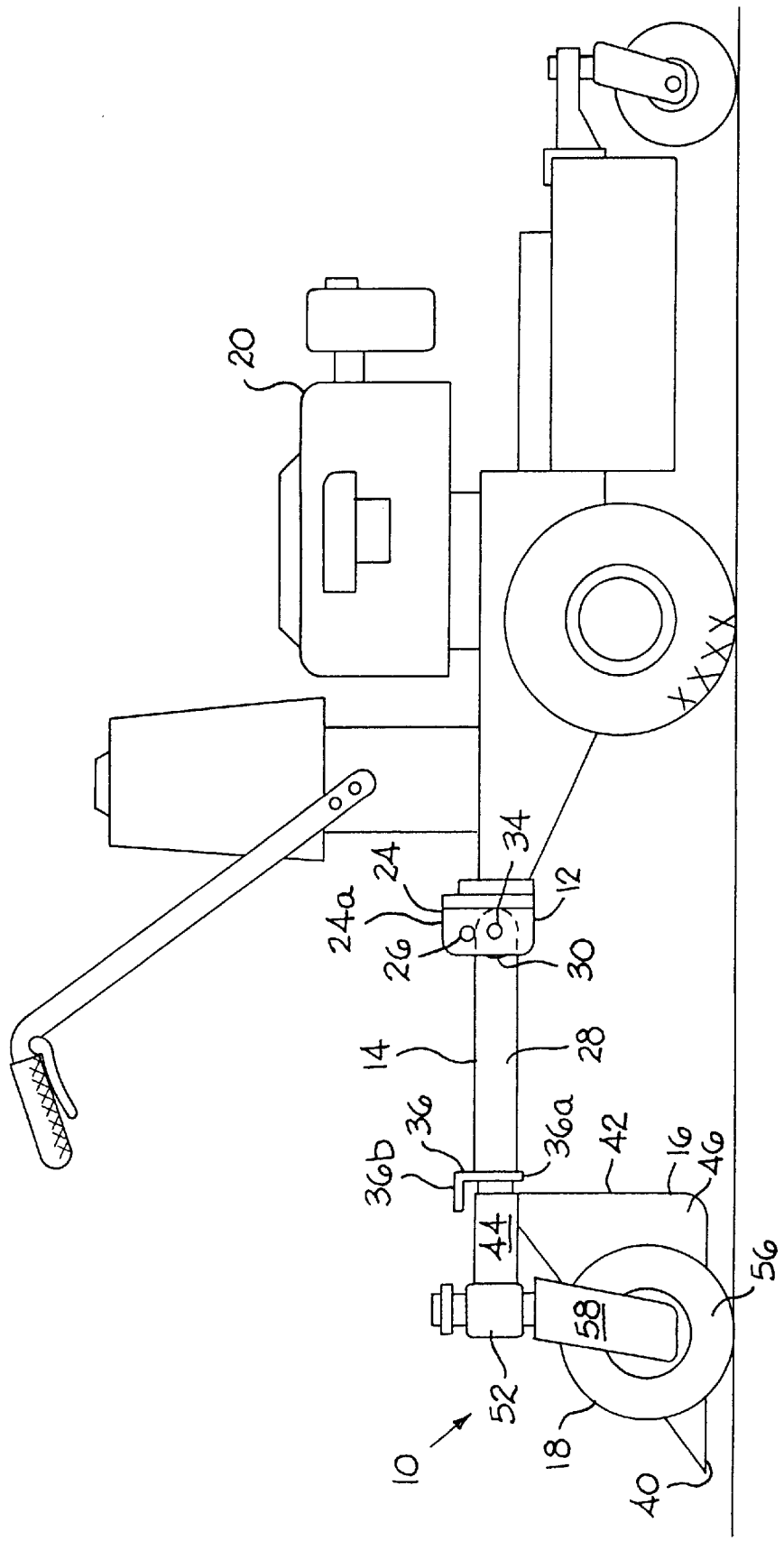
FIG. 4 is a side view of a typical lawnmower coupled to the riding attachment of the present invention.
Figure 5:
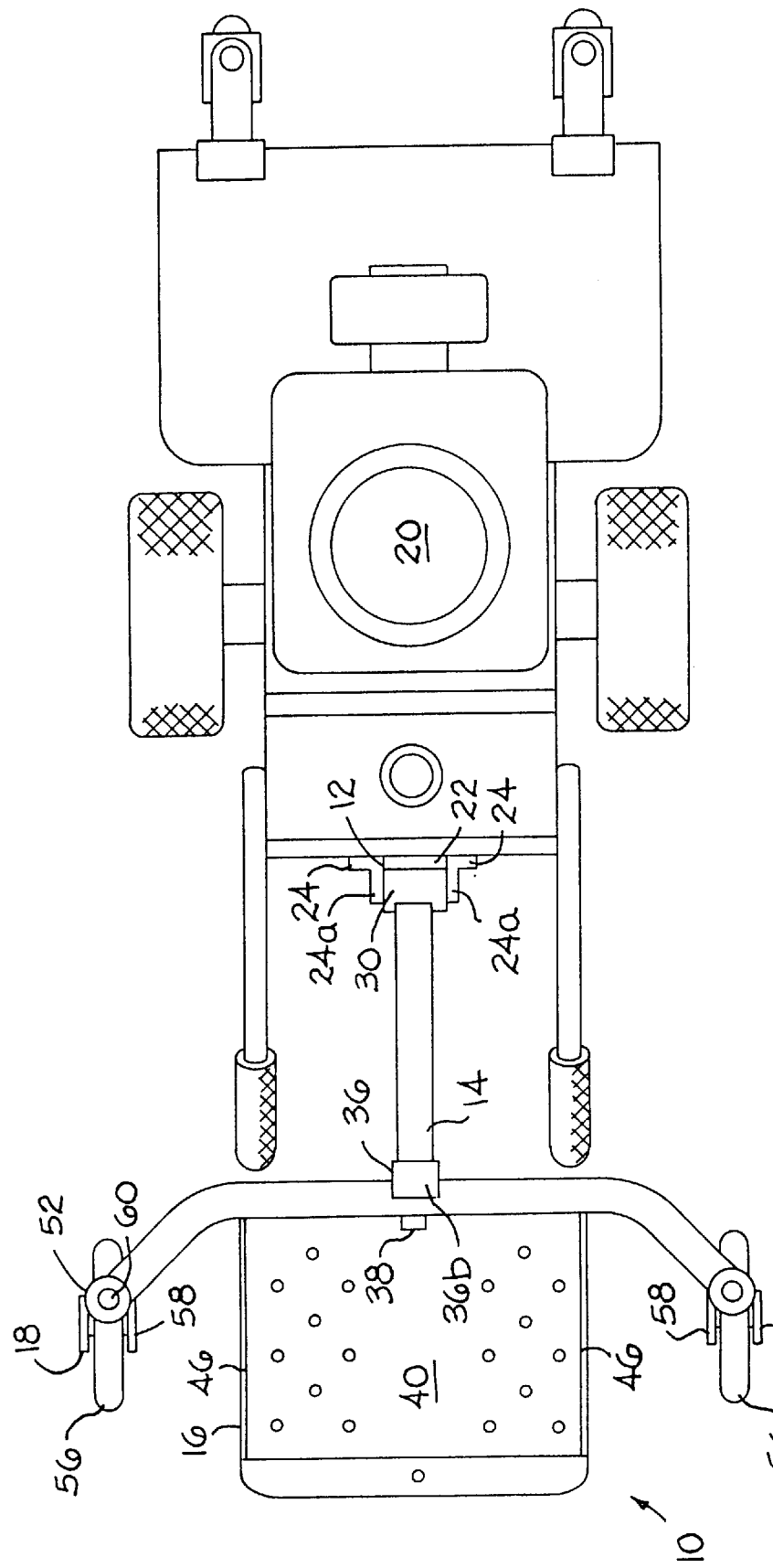
FIG. 5 is a top view of the lawnmower and riding attachment shown in FIG. 4.

Referring the Figures, and particularly FIG. 1 and the side view of FIG. 4, it may be seen that the operator-carrying sulky of the present invention, shown generally by character numeral 10, comprises a mounting bracket assembly 12, a tow bar assembly 14, a riding assembly 16, and a wheel assembly 18. The various assemblies are easily connected and disconnected for use and maintenance. The mounting bracket assembly 12 serves as a connection between the lawn mower 20 and the tow bar assembly 14. In the preferred embodiment, the mounting bracket assembly is comprised of a rectangular steel plate 22 to which two L-shaped steel brackets 24 are welded. The mounting bracket is welded or otherwise attached to the lawn mower 20 with the rectangular plate 22 oriented in a plane perpendicular to the ground. In this orientation, the legs 24a of each L-shaped bracket 24 point away from the mower 20 toward the rear. A plurality of holes 26 are drilled in each of the legs 24a of the L-shaped brackets 24.

The tow bar assembly 14 provides the connecting link between the mounting bracket assembly 12 and the riding assembly 16. In the preferred embodiment, the tow bar assembly 14 comprises, in part, a tow bar 28 in the form of a length of square steel tubing that terminates at one end in a cylindrically shaped boss 30 defining a bore 32. The boss 30 has a length slightly greater than the outer diameter of the tow bar 28. The boss 30 may be fitted as desired with bushing material (not shown) and, when bore 32 is properly in registry with holes 24a of the mounting bracket assembly 12, receives a lynch or locking pin 34 to pivotally lock the tow bar assembly 14 to the bracket assembly 12. The other end of the tow bar 28 is integrally connected to a turn limiting, L-shaped flange plate 36 and a pivot pin 38. A first leg 36a of flange 36 is welded to a center portion of tow bar 28 with the second leg 36b extending over and spaced a predetermined distance from the top surface 44a of the support bar 44 of the riding assembly 16, as will be further described. The pivot pin 38, welded or otherwise secured to flange plate 36, is positioned to extend out from the flange 36 plate along an extension of the centerline of tow bar 28.

The riding assembly 16 essentially must facilitate rapid attachment to and detachment from the tow bar assembly 14, allow for similar attachment and detachment of the wheel assembly 18, and be sufficiently sturdy to carry the weight of the operator. In the preferred embodiment, the riding assembly 16 includes an L-shaped main carriage defining an essentially horizontal platform 40 and a vertical front wall 42. The platform 40 is made of a sturdy material such as plate steel capable of supporting a standing operator and may be supplied with treads or an anti-slip material on the top surface thereof. The front wall 42 is welded or otherwise attached to the underneath surface of a C-shaped support bar 44 made of steel or similarly sturdy material. Providing further structural integrity to the riding assembly 16 are two essentially right angle trapezoidal gussets 46 welded to the sides of the platform 40 and front wall 42. The front wall 42 and the gussets 46 also protect the lower part of the operator's legs from extraneous material that might be dislodged during mowing operation and thrown toward the operator.

The center of the support bar 44 defines a bore 48 which receives the pivot pin 38 locked into position by a lynchpin 50. Bushing material (not shown) may be used to line bore 48 as desired to facilitate pivoting of pivot pin 38. Finally, each of the distal ends of the support bar 44 define a cylindrical boss 52 with a downwardly extending bore 54 preferably provided with roller or ball bearings (not shown). The two wheel assemblies 18 each have a tire 56 appropriately mounted between a wheel yoke 58. A yoke pin 60 extends upwardly into a bore 54 and is locked into place by a latch pin 62. The upper surface of yoke 58 may have a bearing surface contacting the boss 52 to facilitate free rotational movement of the wheel yoke 58.

Other important features of the present invention involve the connections between the mounting bracket assembly 10, the tow bar assembly 12, and the riding assembly 16, and the relationship and positioning of the various axes of rotation. When holes 26 of the mounting bracket assembly 10 and the bore 32 of boss 30 are in registry, connecting pin 34 is positioned parallel to the "plane of the mower". The plane of the mower is best defined as the plane determined by the contact points of the wheels of the mower 20 with the underlying terrain surface. If the terrain surface is horizontal, then the mower plane and thus the axis of rotation of the tow bar assembly 14 about the connecting pin 34 would be horizonal. If the terrain is uneven, then the mower plane and the tow bar axis of rotation would be tilted with respect to the horizontal reference plane. Additionally, the axis of rotation of the tow bar assembly 14 is essentially transverse to the movement of the mower 20. Rotation of the tow bar assembly 12 about a vertical axis, however, is not permitted. The riding assembly 16, through the connection of the support bar 44 to the pivot pin 38, is permitted to have limited rotation with respect to the tow bar assembly 14 about an axis essentially parallel to the mower plane and aligned parallel to the movement of the mower 20. Again, rotation about a vertical axis is not permitted. The tow bar assembly 14 and riding assembly 16 are therefore compelled to follow the mower 20 without any relative horizontal movement between the handle bars 21 and the riding assembly 16. This prevents jackknifing or contact of the handle bars with the operator's body when sharp turns of the mower are required. Additionally, the predetermined distance or gap 64 between the leg 36b and the top surface 44a of the support bar 44 allows for rotation until the top surface 44a of said support bar 44 abuts the leg 36b of the flange plate 36. Preferably, the gap 64 limits rotation relative to the tow bar 28 to an angle no more than about 20° from a rest position or zero angle position where the top surface 44a of the support bar 44 is parallel with the flange leg 36b. This maximum angle is called the predetermined maximum displacement angle. By limiting the displacement angle to this maximum, when severely uneven terrain is encountered, the risk of dislodging the operator or overturning of the riding assembly is minimized.

It is understood that, in light of a reading of the foregoing description and drawings, those with ordinary skill in the art will be able to make changes and modifications to the present invention without departing from the spirit or scope of the invention, as defined in the following appended claims

I claim:

1. A combination of a power driven lawn mower and a riding attachment connected to the lawn mower for carrying a rider standing on a platform in which said riding attachment comprises:

a tow bar assembly pivotally connected to said mower for pivoting about a first axis essentially parallel to a mower plane and essentially transverse to the direction of movement of said mower, said tow bar assembly constrained against pivoting with respect to the mower about an axis essentially vertical;

a riding assembly, including said platform, pivotally connected to said tow bar assembly for pivoting about a second axis which is defined by the tow bar assembly and is essentially parallel to the mower plane and parallel to the direction of movement of said mower, said riding assembly constrained against pivoting about an axis essentially vertical with respect to the tow bar assembly; and a pivot limiting element associated with said tow bar assembly for limiting the pivoting of said riding assembly about said second axis so that said riding assembly may freely pivot about said second axis as the riding attachment moves over uneven terrain but is prevented from rotating past a predetermined maximum displacement angle, thereby protecting said rider from dislodgment;

wherein said tow bar assembly includes a tow bar, said riding assembly further including a support bar pivotally connected to said tow bar about said second axis, said pivot limiting element being connected to said tow bar and extending over and spaced from said support bar a distance sufficient to limit maximum pivoting of said support bar with respect to said tow bar to said predetermined maximum displacement angle.

2. The combination of claim 1, in which said support bar has a rectangular cross section and said pivot limiting element is an L-shaped member with a first leg connected to said tow bar and said a second leg extending out over said support bar.

3. The combination of claim 2, in which tow bar has a rectangular cross section.

4. An attachment for a power mower adapted to allow an operator to stand behind and be pulled by the mower during operation comprising:

a tow bar;

a bracket assembly adapted to be secured to the mower, said bracket assembly being pivotally connectable to a first end of said tow bar such that said tow bar pivots about a first axis parallel to a plane of the mower and transverse to the direction of movement of the mower;

a riding assembly pivotally connected to a second end of said tow bar such that said riding assembly pivots about a second axis which is defined by the tow bar and is parallel to the plane of said mower and in the direction of movement of said mower; and a pivot limiting element associated with said tow bar for limiting the pivoting of said riding assembly about said second axis so that said riding assembly may freely pivot about said second axis as the riding attachment moves over uneven terrain but is prevented from rotating past a predetermined maximum displacement angle, thereby protecting said operator from dislodgment;

wherein said pivoting element is attached near said second end of said tow bar and abuts said riding assembly when said riding assembly rotates to said maximum displacement angle, thereby preventing further rotation of said riding assembly.

5. A carriage adapted to be secured to a powered lawn mower for carrying an operator in a standing position comprising:

a platform for carrying said operator;

a plurality of wheels rotatably coupled to said platform;

a tow bar adapted to be attached to said powered lawn mower at a first end and having a pivot pin extending out from a second end along a longitudinal center line of said tow bar, said platform being operatively coupled to said pivot pin and pivoting about said pin; and a pivot limiting element for limiting pivoting of said platform about said pin to a predetermined limit angle thereby minimizing the risk of said carriage overturning and the risk that said operator will be dislodged when said tow bar is attached to said mower for operation thereof;

wherein said carriage includes an essentially vertical front wall and a support bar, said platform being secured to the bottom of said front wall and said front wall being secured to an underneath surface of said support bar, said pivot limiting element abutting said support bar when said platform is pivoted to said predetermined limit angle and preventing further pivoting of said platform.

6. The carriage of claim 5, in which said support bar has a pair of distal ends each pivotally connected to one of said wheels.

7. The carriage of claim 5, wherein said tow bar and said support bar have rectangular sections, said support bar defining a bore for receiving said pivot pin, said pivot limiting element being an L-shaped member with a first leg secured to said tow bar and a second leg projecting out over said support bar adjacent said pin for abutting said support bar when said platform is pivoted to said predetermined limit angle.

* * * * *